United States Patent
Reichert

(10) Patent No.: US 8,321,276 B2
(45) Date of Patent: Nov. 27, 2012

(54) PROCESSING OF COMMERCE-BASED ACTIVITIES

(75) Inventor: Tal Reichert, Medford, MA (US)

(73) Assignee: Odysii Technologies Ltd, Herzeliya (IL)

( * ) Notice: Subject to any disclaimer, the term of this patent is extended or adjusted under 35 U.S.C. 154(b) by 468 days.

(21) Appl. No.: 12/697,867

(22) Filed: Feb. 1, 2010

(65) Prior Publication Data
US 2011/0191164 A1    Aug. 4, 2011

(51) Int. Cl.
*G06Q 30/00* (2012.01)
(52) U.S. Cl. .................. 705/14.43; 705/14.45
(58) Field of Classification Search ............... 705/14.43, 705/14.45
See application file for complete search history.

(56) References Cited

U.S. PATENT DOCUMENTS

| | | | |
|---|---|---|---|
| 2002/0116237 A1* | 8/2002 | Cohen et al. | 705/7 |
| 2002/0116348 A1* | 8/2002 | Phillips et al. | 705/400 |
| 2003/0220830 A1* | 11/2003 | Myr | 705/10 |

* cited by examiner

*Primary Examiner* — Daniel Sorkowitz
(74) *Attorney, Agent, or Firm* — Gilman Clark & Hunter LLC; Ido Rabinovitch

(57) ABSTRACT

Disclosed are systems, methods and devices, including a method that includes receiving information about one or more transactions, each transaction including a respective sale of at least one first item selected by a customer and an offer of cross-sale of at least one second item offered to the customer, the information about each of the transactions including information about an outcome of the respective offer of cross-sales. The method further includes determining effectiveness measures based on the received information, with each of the effectiveness measures being associated with at least one of a plurality of combinations of at least one purchasable item and a corresponding offer of cross-sale of at least another purchasable item. The effectiveness measures are representative of a likelihood of the corresponding offer of the cross-sale being accepted when offered in combination with the respective at least one purchasable item.

21 Claims, 6 Drawing Sheets

PROCESSING OF COMMERCE-BASED ACTIVITIES

BACKGROUND

This disclosure relates to commerce-based activities, and more particularly to processing of commerce-based activities.

Digital signage devices, also referred to as Point-of-Sale (POS) devices, are used to display advertisements and/or other audiovisual items to consumers, to consummate commercial transactions (i.e., to complete sales transactions), and to generally facilitate commerce-based activities. For example, one use of POS devices is to enter transactional orders, e.g., through the assistance of a sales-person, or by the consumer him/herself (when the POS device is adapted to be a self-serve POS device). The POS device can be used to generate the transaction details, for example, a listing of the items that the customer wishes to purchase, the respective prices of each item, the total payable price, etc. In some embodiments, the POS device may be one of several POS devices deployed in a particular outlet that are interconnected to a central computing system used to process the information entered to and/or computed by individual POS devices. The central computing system may perform additional processing on the data collected, including, for example performing such functions as inventory control, marketing, etc.

SUMMARY

The present disclosure is directed to technology, systems, methods and articles to perform processing, including adaptive processing, of commerce-based activities, including methods and systems in which cross-sale offers (e.g., items/service a customer may wish to acquire in addition to the customer's initial order) are determined based, at least in part, on dynamically updated effectiveness measure values associated with items that are to be cross-sale offered. These effectiveness measures are representative of the likelihood that the customer will accept the cross-sale offers. The determination of cross-sale offers may also be based, in some embodiments on other selection parameters, such as, for example, confidence intervals, which are measures representative of uncertainty ranges associated with corresponding effectiveness measures.

The systems, methods and articles described herein may contribute to an increase in revenues generation by offering customers the opportunity to purchase additional items (goods or services) associated with established likelihoods that those items would be purchased if offered to the customers already acquiring the initially ordered items.

In one aspect, a method performed by execution of computer readable program code on one or more processor-based computing devices is disclosed. The method includes receiving, at the one or more processor-based computing devices, information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item. The method further includes determining, at the one or more processor-based computing devices, effectiveness measures based on the received information, each of the effectiveness measures being associated with at least one of a plurality of combinations of at least one item from the plurality of purchasable items and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items.

Embodiments of the method include any of the following features.

Determining the effectiveness measures based on the received information may include computing probability values to correlate the respective outcome of the offer of cross-sale of each of at least some of the one or more transactions to at least some of the plurality of purchasable items.

The method may further include determining, based on the determined effectiveness measures, a subsequent offer of cross-sale of a subsequent at least one second item to be offered to a subsequent customer purchasing a subsequent at least one first item in a subsequent transaction.

Determining, based on the determined effectiveness measures, the subsequent offer of the cross-sale of the subsequent at least one second item may include identifying from the plurality of combinations a combination associated with the largest effective measure of combinations from the plurality of combinations including a respective at least one item to be purchased matching the subsequent at least one item being purchased.

The method may further include presenting to the subsequent customer the subsequent offer of the cross-sale of the subsequent at least one second item.

The method may further include presenting the subsequent at least one first item in a first area of a display device, and presenting the subsequent at least one second item in a second area of the display device.

The method may further include computing confidence interval values associated with at least some of the effectiveness measures, the confidence interval values being representative of uncertainty associated with respective the at least some of the effectiveness measures.

The method may further include determining, based on values computed based on the at least some of the effectiveness measures and selected random values within the respective associated confidence intervals, a subsequent offer of cross-sale of a subsequent at least one second item to be offered to a subsequent customer purchasing a subsequent at least one first item in a subsequent transaction.

The information about each of the one or more transactions may further include one or more of, for example, description of the at least one first item, price of the at least one first item, sum of the price of all the at least one first item, time of the each of the one or more transactions, a description of the corresponding at least one second item offered in the cross-sale of the each of the one or more transactions and/or a price of the corresponding at least one second item offered in the cross-sale of the each of the one or more transactions.

The plurality of purchasable items may include at least one food product.

In another aspect, a computer program product residing on a computer readable storage device is disclosed. The computer program product includes computer instructions that, when executed on one or more processor-based devices, cause the processor-based device to receive information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item. The computer instructions also cause the one or more processor-based devices to determine effectiveness measures based on the received information, each of the effectiveness measures being associated with a corresponding at least one of a plurality of combinations of at least one item from the plurality of purchasable items and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items.

Embodiments of the computer program product include one or more of the above-described features of the method, as well as the following feature.

The computer program product may further include instructions to cause the one or more processor-based devices to determine, based on the determined effectiveness measures, a subsequent offer of cross-sale of a subsequent at least one second item to be offered to a subsequent customer purchasing a subsequent at least one first item in a subsequent transaction.

In a further aspect, a system is disclosed. The system includes at least one processor-based device, and a storage device coupled to the at least one processor-based device, the storage device storing computer instructions that when executed on the at least one processor-based device cause the at least one processor-based device to receive information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item. The computer instructions further cause the at least one processor-based device to determine effectiveness measures based on the received information, each of the effectiveness measures being associated with a corresponding at least one of a plurality of combinations of at least one item from the plurality of purchasable items to be purchased and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items.

Embodiments of the system include one or more of the above-described features of the method and/or the computer program product, as well as the following feature.

The system may further include a point-of-sale (POS) device that includes a display device, a user input device to receive user input including user selection of the at least one first item and information about the outcome of the offer of cross-sale of the at least one second item, and a communication transceiver to transmit to the at least one processor-based device at least the user selection of the at least one first item and the information about the outcome of the offer of cross-sale.

In yet another aspect, a method for performing adaptive commerce-based activities, performed by execution of computer readable program code on one or more processor-based computing devices, is disclosed. The method includes receiving, at the one or more processor-based computing devices, information about at least one transaction, the at least one transaction including information about at least one first item selected by a customer from a plurality of purchasable items, determining, at the one or more processor-based computing devices, at least one second item to be presented to the customer based on the received information and based on effective measures that are each associated with at least one combination from a set of combinations that each includes the at least one first item to be purchased and a corresponding offer of cross-sale of at least one other item from the plurality of purchasable items, each of the effectiveness measures being representative of a likelihood that the at least one other item to be offered to the customer would be accepted when offered in combination with the at least one first item being purchased. The method further includes communicating information to the customer about a cross-sale offer to purchase the determined at least one second item.

Embodiments of the method include one or more of the above-described features of the first method, the computer program product and/or the system, as well as any of the following features.

The method may further include presenting the at least one first item in a first area of a display device, and presenting the determined at least one second item in a second area of the display device.

The method may further include receiving a further communication responsive to the information communicated to the customer abut the cross-sale offer, the further communication including information about an outcome of the cross-sale offer.

The method may further include adjusting the effectiveness measures based, at least in part, on one or more of the information about the at least one transaction, the information about the cross-sale offer, and the information about the outcome of the cross-sale offer.

In a further aspect, a point-of-sale device is disclosed. The device includes a display device, a user input device to receive input including customer selection of at least one first item and information about an outcome of an offer of cross-sale of at least one second item presented to the customer on the display device, and a communication module to communicate to at least one processor-based device at least one of the selection of the at least one first item and the information about the outcome of the offer of cross-sale. The at least one second item presented to the customer is determined, at the at least one processor-based device, based, at least in part, on the selection of the at least one first item and based on effective measures that are each associated with at least one combination from a set of combinations that each includes the at least one first item to be purchased and a corresponding offer of cross-sale of at least one other item from a plurality of purchasable items, each of the effectiveness measures being representative of a likelihood that the at least one other item from the plurality of purchasable items to be offered to the customer would be accepted when offered in combination with the at least one item.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
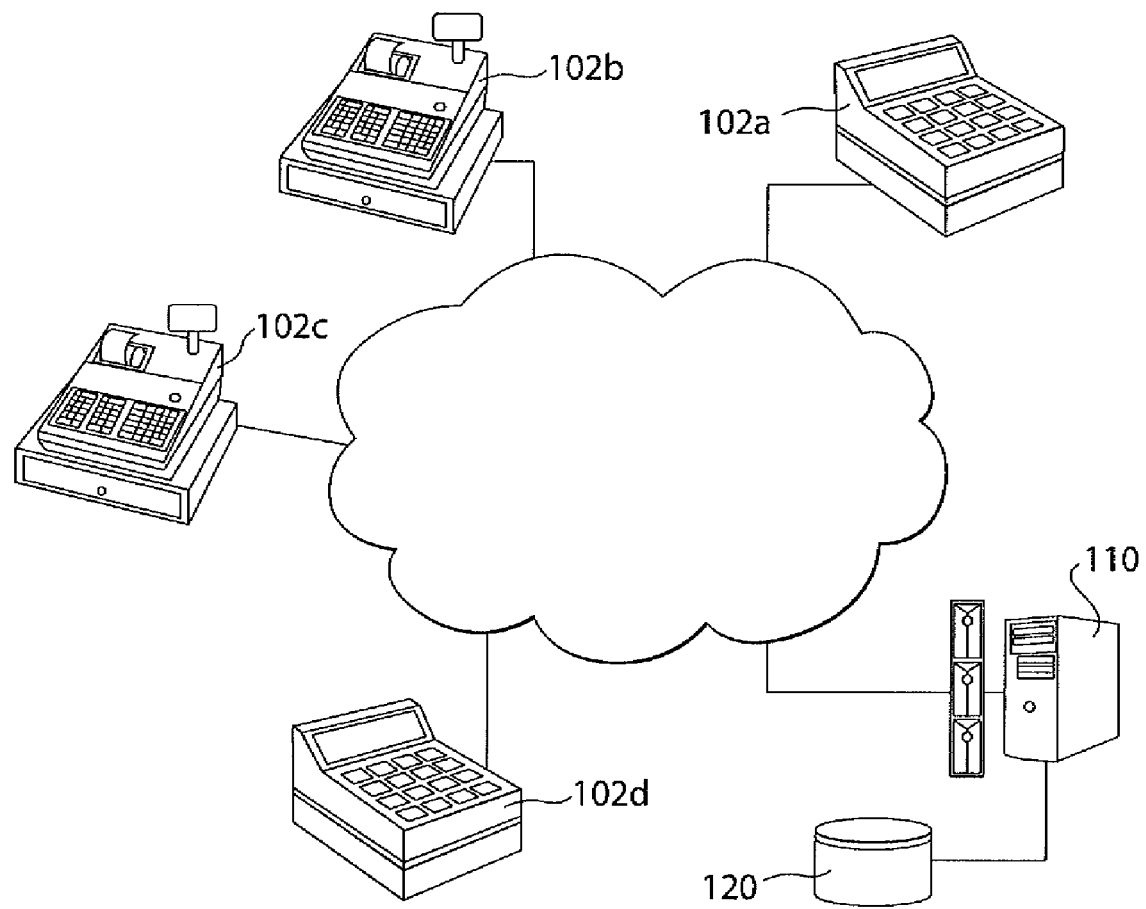
FIG. 1 is a schematic diagram of a multi-POS (point of sale) system configured to enable processing of commerce-based activities.

Disclosed are systems, methods and articles for processing of commerce-based activities, including a method in which a customer buying at least one first item is presented with a cross-sale offer for sale of at least one other, second, item. The cross-sale offer is associated with a certain likelihood that the customer would also buy the second item given that the customer is buying the at least one first item. Thus, embodiments described herein include a method, performed, for example, by execution of computer readable program code on a processor-based device, that includes receiving, at one or more processor-based devices, information about one or more transactions, with each of the one or more transactions including a respective sale of at least one first item selected by a customer from a plurality of items and an offer of cross-sale of at least one second item offered to the customer from the plurality of items. The information about the each of the one or more transactions includes information about an outcome of the respective offer of cross-sales of the at least one second item (e.g., whether the offer was successful). In some implementations, the information is sent, at pre-determined intervals, as part of an aggregation of information used to update data used for item selection.

The method also includes determining, at the one or more processor-based devices, effectiveness measures (e.g., adjusting existing effectiveness measures or determining new effectiveness measures) based on the received information, each of the effectiveness measures being associated with at least one of a plurality of combinations of at least one item from the plurality of purchasable items and a corresponding offer of cross-sale of at least another item from the plurality purchasable items, each of the effectiveness measures being representative of a likelihood of the corresponding offer of the cross-sale of the at least other item being accepted when offered in combination with the respective at least one item from the plurality of purchasable items.

Also disclosed is a method for performing commerce-based activities (performed, for example, by execution of computer readable program code on a processor-based computing device) using determined effectiveness measures. The method includes receiving information about one or more transactions, each of the one or more transactions including a respective sale of at least one first item selected by a customer from a plurality of items and determining at least one second item to be presented to the customer based on the received information and based on effective measures that are each associated with at least one combination from a set of combinations that each includes the at least first item to be purchased and a corresponding offer of cross-sale of at least one other item from the plurality of items. Having determined at least one such second item that can be offered to the customer as part of a cross-sale opportunity, the method further includes communicating information to the customer about the cross-sale offer to purchase the determined at least one second item.

With reference to FIG. 1, a schematic diagram of a multi-POS (point of sale) system 100 configured for adaptive learning and determination of commerce-based activities is shown. The system 100 includes one or more Point-of-Sale ("POS") devices 102a-d that are deployed in one or multiple outlets. For example, the POS devices 102a-d may be located at various outlets/branches of a fast-food seller. Each outlet may include one or more of the individual POS devices depicted in FIG. 1.

In some embodiments, one or more of the POS device, for example, the POS device 102a, may be an electronic cash register operable by an operator (e.g., in a fast-food joint, a supermarket, or some other retail outlet). In some embodiments, one or more of the POS devices may include, for example, a check-out point in which a user completes purchasing transactions without the assistance of a live operator by, for example, inputting information about an item or service it wishes to purchase through a suitable input-interface such as, for example, an optical scanner, a keyboard, a RFID sensing device, etc. In some embodiments, one or more of the POS devices may be a POS device such as the one described, for example, in U.S. patent application Ser. No. 11/314,713, entitled "Systems and methods for automatic control of marketing actions", and U.S. patent application Ser. No. 11/611,481, entitled "Exposure-Based Scheduling," the contents of both of which are hereby incorporated by reference in their entireties.

Figure 2:
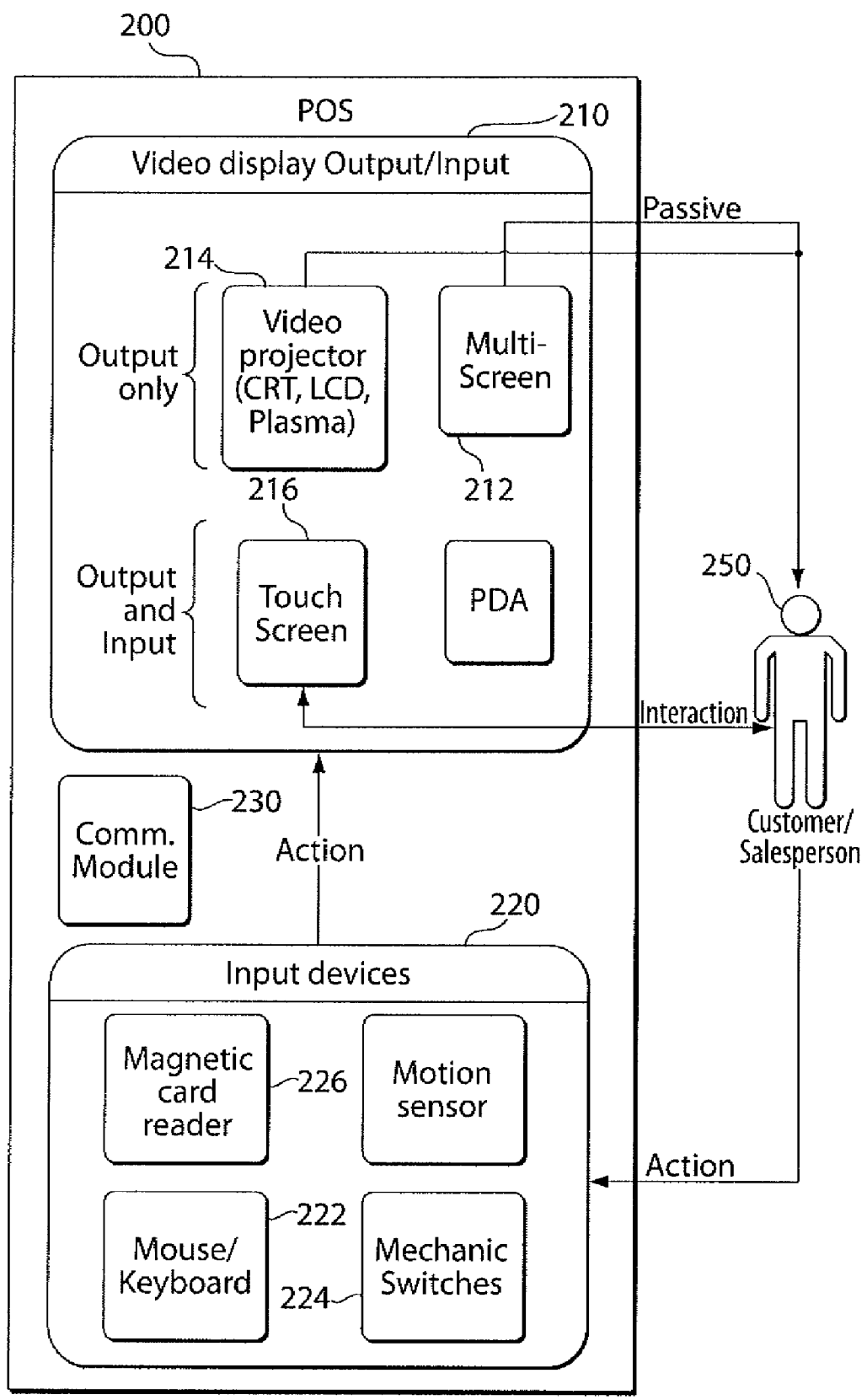
FIG. 2 is a schematic diagram of a generic POS device.

With reference to FIG. 2, a schematic diagram of a generic POS device 200, which may be similar to any one of the POS devices 102a-d illustrated in FIG. 1, is shown. The POS device 200 includes an input/output display 210. The display 210 can include one or more of display devices such as a multi-screen device 212, and/or a video projector 214. Examples of suitable video projector devices that the display 210 may use include cathode-ray-tube based devices, liquid crystal display type devices, and/or plasma type display devices. Other types of display devices may be used.

In some implementations, the display 210 may further include devices whose display surface is configured to receive input from a user 250 (such as a customer or a salesperson) interacting with the POS device 200. Thus, in some embodiments the display unit 210 may include a touch screen device 216 having a touch sensitive surface to enable users to enter data and/or make selections by directly touching areas of the screen as directed by graphical and/or audible prompts appearing on the screen.

As further shown in FIG. 2, the POS device also includes input device unit 220. The input device unit may include one or more of the input devices depicted in FIG. 2 to enable the user 250 to enter data and make selections in a variety of ways. Thus, for example, the input device unit 220 may include a mouse/keyboard device 222, and/or mechanical switches unit 224. The input device unit 220 may include other types of data entry and/or data collection devices, including a magnetic and/or optical reader 226 (e.g., to swipe magnetic cards such as credit or debit cards).

As will be described in greater details below, input collected by one or more of the various POS devices may be sent to a central computing system 110 for recordation and processing. Thus, each POS device may include a communication module 230, such as, for example, a transceiver, a network gateway, a wireless transceiver, etc., to transmit information collected or received at the POS 200 to a remote device, such as another POS device or a central server. Alternatively and/or additional, the collected data may be locally recorded and/or processed to generate resultant data at a processor-based device constituting part of the POS device collecting the customer's input. Information collected by POS device 200 may be first stored in local storage (e.g., volatile and non-volatile memory, not shown) of the POS device 200.

Thus, in some embodiments, input collected via a POS device is communicated to, for example, the central computing system whereupon the received input is used, for example, to identify relevant combinations of first items corresponding to the customer's selection and associated second one or more items that may be offered to the customer as a cross-sale opportunity (also referred to as an up-grade offer or up-sale offer). One or more such combinations are then identified or determined, and data corresponding to that determined one or more combinations is communicated to the POS from which the customer's input was received. Such information may include particulars regarding the one or more items to be offered as a cross-sale to the customer, including a description of the one or more items being offered, their prices, visuals of the items (e.g., a picture and/or video of the items), any applicable discounts or specials to be offered as part of the cross-sale offer, etc.

Turning back to FIG. 1, as noted, in some implementations, at least one of the POS devices 102*a-d* is in communication with a computing system (such as a central server) 110. Information collected by any of the POS coupled to the computing system 110 is sent to the computing system 110, whereupon that information is processed. Particularly, the computing system 110 receives information from the various POS devices, including information regarding a transaction that is to be completed by the customer. For example, in circumstances where the transaction pertains to the purchase of one or more items (e.g., food items), the information communicated to the computing system 110 may include the identities of the one or more items to be purchased, prices of the one or more items, the time at which the initial order was made, and other data germane to the transaction (e.g., applicable discounts, geographic locale where the transaction is to be completed, etc.) The computing system receives from the POS devices the collected information corresponding to transactions, and uses that information to determine one or more cross-sale offers to be offered to the customer. In some embodiments, the computing system may also receive information from other systems (e.g., backend systems of the company operating the POS devices). Such information may include, for example, data about inventory levels, and may be thus be used to further facilitate the processing of the transactions information to refine the determination of cross-sale offers to take that additional information into account.

In some embodiments, the one or more cross-sale offers are identified from a set of combinations that includes records, or entries, of combinations of one or more first items (i.e., items that can initially chosen by a user) and corresponding one or more second items, i.e., items that may be offered as a cross-sale offer to a customer. In some embodiments, there may be multiple combinations associated with the same one or more first items and the one or more second items, with each of those multiple combination corresponding to different promotions (e.g., different promotion content, different discounts or other incentives, etc.) For example, two separate combinations may each include a cheeseburger as the first item selected by the customer, and a medium sprite as the cross-sale second item to be offered. These two combinations may, however, correspond to different promotions.

Each combination in the repository 120 is also associated with an effectiveness measure that represents the probability that a customer would accept the one or more second items of that combination being cross-sale offered given that the customer already picked the associated one or more first items. In some embodiments, the combination may also be associated with other data, such as a confidence interval representative of the uncertainly associated with effectiveness measures. Thus, a communication sent by one the POS that includes information identifying one or more first items (e.g., food items) selected by the customer is then used to access a repository 120 of combinations to determine a sub-group with those combinations that include the particular one or more food items selected by the customer. The repository 120 may be a local or remote mass storage device that may be managed or controlled by a commercial or customized data management application. In some embodiments, the combination associated with the highest effective measure from the combination in the determined sub-group is selected, and information based on that combination, including the identity of one or more second food items to be offered to the customer in a cross-sale offer is presented to the user. In some embodiments, several combinations may be selected (e.g., 3-5 combinations having the highest respective effectiveness measures), and a scheme incorporating a randomness element may be used to select one of those combinations so that more than one combination (corresponding to promotions) may have an opportunity to be presented to customers.

To illustrate operation of the system 100 consider, for example, a scenario in which a customer in a fast-food joint orders a cheeseburger and a medium soft-drink. Upon inputting the particulars of this order (e.g., by a cashier manning a cash register, or by the customer him/herself entering the order through a self-serve POS kiosk), a communication message with the particulars of the order is communicated to the computing system 110. The information in the message, which includes data representative of the identity of the cheeseburger and medium drink items, may be used to access the combination repository and determine a sub-group of combination that includes all those combinations corresponding to the cheeseburger and medium coke initially ordered by the customer. Other information included in the message, for example, the specific location from which the order was placed (e.g., customers behavior vis-à-vis cross-sale offer may vary across geographic locations), the time of day (e.g., customers may be more likely to buy another food item if it's lunch time), etc., may be used to refine the search of the combination repository and the determination of an appropriate sub-group of combinations from which one or more second items may be selected. Thus, in this particular example, a determined sub-group of combinations that may include a combination of a cross-sale offer of French fries with an initially selected combination of a cheeseburger and a medium drink with an effective measure of 25%, and a combination of cheeseburger, medium coke and an apple pie dessert with an effectiveness measure of 20%. The sub-group of combinations may include additional combinations associated with respective effectiveness measures. The computing system 110 may be configured to communicate back to the sending POS a cross-sale communication message offering the one or more items associated with a combination from the determined sub-group that has the highest effectiveness measure.

In some implementations, if the repository 120 does not include a sub-group corresponding to the items selected by the customer, a sub-group corresponding to one of the items selected by the customer (e.g., the subgroup corresponding to cheeseburger) may be used.

In some embodiments, other criteria may be used in the selection process of the one or more items to be communicated back to the sending POS and offered to the customer. For example, in some implementations, the criterion used to select a combination from a determined sub-group of combinations may be the expected profit to be realized by selling the one or more second item to be offered to the customer. For example, suppose, in the above illustration, that the profit to be realized from a successful cross-sale of the French fries is $1.5, whereas the profit to be realized from a successful cross-sale of an apple pie dessert is $3. Under those circumstances, the expected profit, $E_{profit}$, for cross-selling the French fries is 0.25×$1.5=$0.375 (i.e., the product of the profit from cross-selling the French fries and the effectiveness measure for the combination of cheeseburger, medium drink, and French fries), whereas the expected profit for cross-selling the apple pie dessert is 0.2×$3.0=$0.6. Thus, with this criterion, it would be the apple-pie dessert that may be cross-sale offered to the customer rather than the French fries, even though the cross-sale of French fries has a higher effectiveness measure. Other criteria (based on statistical formulas and/or other considerations) may be used to select the one or more second items from the various determined combinations in the sub-group.

Thus, for example, two or more promotions (each corresponding to a combination of one or more items to be offered for cross-sale to the customer) are picked from the available promotions. The selected promotions may be the highest upside promotions (i.e., the promotions with highest likelihood to being accepted by the customer) for the particular one or more items picked by the customer. In some embodiments, a random value in the +/− range of the confidence interval associated with the item(s) of the promotions being considered may be added or subtracted from the effective measure for those promotions to alter the effectiveness measures being considered and to thus enable different promotions to have an opportunity to be presented. Thus, in some implementations, a cross-sale offer responsive to selection of one or more items by a customer is determined based on values that are computed based on effectiveness measures associated with promotions being considered and selected random values within the respective associated confidence intervals for those promotions. For example, to select one or more combinations to promote, the confidence interval values associated with the promotions being considered may be multiplied by a random value between −1 and 1, and the result may then be added to the effectiveness measures associated with those promotions being considered. The adjusted effectiveness measures are then used to select the promotion(s) to present to the customer.

As noted, some of the combinations may include two or more items with a respective effectiveness measure representative of the likelihood that a customer would buy all of second items associated with that combinations (the sub-group of combination may also include separate combinations where the various two or more items appearing together in the multi-item combinations are separated into combinations in which those items appear individually). Thus, in determining which combination in the sub-group of combinations to select to offer to a customer, combinations that have two or more second items may be offered to the customer even if their associated effectiveness measure is lower than other combination that are associated with fewer second items. Combinations with multiple second items may be offered to the customer with an option that the customer may purchase one, some or all of the items in that combination.

In some embodiments, determination of the at least one item to be included in the cross-sale offer to the customer may be performed using a machine learning system. In some implementations, a machine learning system may be configured to iteratively analyze training input data and the input data's corresponding output, and derive functions or models that cause subsequent inputs of first items ordered by a customer to produce outputs consistent with the machine's learned behavior.

In some embodiments, the learning machine system may be implemented based on a neural network system. A neural network includes interconnected processing elements (effectively the systems neurons). The connections between processing elements in the neural network have weights that cause output from one processing element to be weighed before being provided as input to the next interconnected processing elements. The weight values between connections can be varied, thereby enabling the neural network to adapt (or learn) in response to training data it receives. In some embodiments, the learning machine may be implemented as a support vector machine configured to generate, for example, classification functions or general regression function.

In some embodiments, the learning machine may be implemented using decision trees techniques, regression techniques to derive best-fit curves, and/or other types of machine learning techniques.

Figure 3:
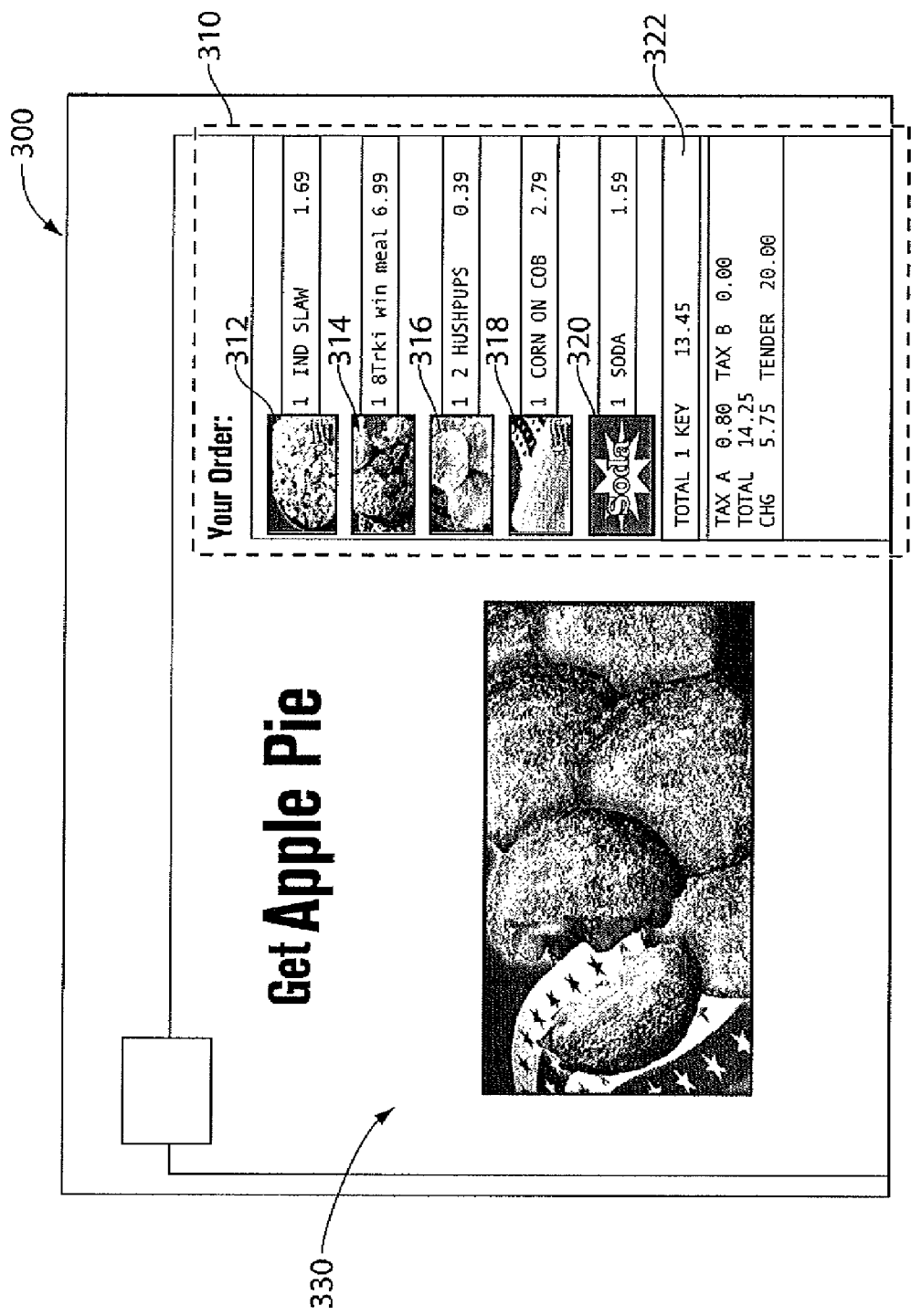
FIG. 3 is a view of an example of generated content that includes details of a cross-sale offer displayed on a display device of a POS device.

The combination selected is presented as a cross-sale offer to the customer at, for example, the POS from which the customer's original order was entered. In some embodiments, the original order, including the one or more items ordered by the customer (and other pertinent information such as the price) is displayed in one area of the display of the POS, while the one or more items determined to be included in the cross-sale offer may be presented in another area of the display. For example, with reference to FIG. 3, an example of generated content 300 that includes particulars of a cross-sale offer displayed on a display device is shown. The displayed content includes a first area 310 in which the customer's initial selection of one or more items the customer ordered are displayed. As shown, the content presented in the area 310 includes the item 312 (e.g., coleslaw), the main course item 314, an order of hushpups 316, an order of corn on the cob 318 and an order of a soft drink 320. Presented next to each of those items are their corresponding prices. At the bottom of the display area 310 is the current total 322 of the order items.

As described herein, information about the ordered one or more items, e.g., the items presented in display area 310, their prices, and/or other types of information, are provided to a computing system, such as the central computing system 110 of FIG. 1, whereupon a determination is made to select one or more second items to be offered in a cross-sale to the customer. Thus, in the example shown in FIG. 3, a cross-sale offer that includes an apple pie is presented in an area 330 of the display. The combination including the apple pie the may have been determined to be the combination to be offered in a cross-sale based on its effectiveness measure (e.g., likelihood of being sold) being the largest of the effectiveness measures of the combinations considered. As noted, in some embodiments, selection of one or more second items to be included in a cross-sale offer may have been based on other criteria. A visual 332 of an apple pie is thus presented in the area 330 of display. In some embodiments, other information may be presented with the identity and/or visual of the cross-sale items, including, for example, the prices of those items, any discounts that may be provided if the customer accepts the cross-sale offer, audio/video presentations for the cross-sale items, etc.

With the cross-sale offer information presented to the customer, the customer decides whether to accept the selected cross-sale offer. As will be described in greater detail below, the outcome of the cross-sale transaction (i.e., the customer's decision to accept or not accept any part of the cross-sale offer) may be used to update the records of the repository 120, e.g., to record the outcome of the cross-sale offer with respect to the combination associated with the cross-sale offer, and to update the parameters, e.g., the effectiveness measures and confidence intervals, used to enable selection of the items to be presented to the customer in a cross-sale offer.

In some embodiments, data will be continuously/periodically gathered from the SOP or delivery stations, communicated and aggregated at the server, and used to compute updated effectiveness measures and other selection parameters (Such as confidence interval values) that may be used in the item selection processes. In some embodiments, to update the parameters used in the item selection processes, the number of successful displays/offers (as defined below) is computed per each promotion, while giving a smaller weight to in-family sales as opposed to a direct product sale (such weight becoming lower the larger the family is). As will further become apparent below, in some implementations, the success value for a particular item may be further adjusted, e.g., subtracting an estimate of the number of random sales that should not be attributed to the actual promotion. The adjusted success value can then be divided by the number of times its promotion was presented to provide a new estimate for the probability. Together with a confidence interval estimate, a weighted average using existing (i.e., old) effectiveness measures and confidence interval values (the confidence interval values are periodically updated to reduce their weight to reflect obsolescence of older values) are used to compute updated effectiveness measure and/or confidence interval values.

The computing system 110 is configured to perform computations to determine updated effectiveness measures associated with combinations corresponding to items selected by a customer. The computation performed may include, for example, computing probability values to correlate the received outcome of completed cross-sale transactions to at least some of the plurality of items (i.e., the items from which the various combination records are formed). Thus, the outcome for of the cross-sale transaction may be used not only to compute probability values correlating the outcome of the offer of cross-sale to the combination corresponding to the initial customer's order and the associated cross-sale offer, but to also compute probability values, in some embodiments, for other combinations and/or individual items from the plurality of items. For example, if the original selection by the customer was for a cheeseburger and a medium soft-drink, the determined cross-sale offer was for French fries, and the customer accepted the cross-sale offer, the successful outcome may subsequently be used to compute probability values to update the effectiveness measure not only for the combination of cheeseburger, medium soft-drink and French fries, but to correlate the successful outcome to the effectiveness measures of, for example, any combination that includes any of the items included in the above combination (e.g., any combination that includes at least one of a cheeseburger, a medium soft drink and/or French fries).

In some embodiments, determination of cross-sale offers based on effectiveness measure are performed using a dynamic adaptive computation of probabilities/likelihoods of successful cross-sales of for each combination of at least one item and a computation of an associated confidence interval value, representative of the uncertainly associated with the computed probability (i.e., representative of how sure we are of the computed probability), for that same combination of at least one item. In some implementations, additional values may be associated with each combination that may be offered as a cross-sale. An example of such an additional value is the Potential Profit value, indicative of the profit that may be made if a successful cross-sale is achieved for the associated combination of at least one item. Thus, in some embodiments, a combination of at least one item may be associated with a set of values that includes the probability of a successful cross-sale (i.e., the effectiveness measure), a confidence level relating to the probability, and a Potential Profit value.

To dynamically adjust the effectiveness measures and other data maintained in the repository 120, in some embodiments, cross-sale data is collected over a particular time interval (e.g., hour, day, week, etc.) from one or more of the POS devices, and at the conclusion of the particular time interval, the collected data is used to update the table of effectiveness measures. In collecting the data, the following procedure may be used.

For each potential transaction promotion, e.g., upgrade, cross-sale or up-sale of another item(s) in response to a selection by a customer of a first combination of items, the number of times that a particular item was offered to a customer as an upgrade, cross-sale or up-sale, since the last adjustment, is summed-up. The number of times that a particular item was offered/displayed may be denoted as $N_p$. Additionally, the number of times that the particular item(s) was successfully offered/displayed is also summed-up. A successful offer/display is one in which:

The promotion was displayed in the course of the transaction.

After the promotion for a cross-sale item(s) was displayed, within the same transaction (order), the customer purchased the cross-sale item(s) being promoted at the POS.

In circumstances where a customer may be presented with multiple different promotions for a particular item(s), the promotion that was presented immediately before the customer accepted the offer may be credited with the sale, and the success counter (tally) associated with that promotion should be incremented. For example, suppose a promotion for product X is presented, then a promotion for product Y, and then another promotion for product X (potentially with different graphics or language from the previous one). Following that, the customer buys product X. Only one of the two promotions associated with product X may receive "credit" for this sale, i.e., in such embodiments, no more than one promotion should be credited for the sale. Alternatively and/or additionally, if an item was presented in multiple promotions before the customer decided to purchase the promoted item, then it is possible that all the promotions presented contributed to the enticement of the customer to buy that item, and thus the success of selling the item should be attributed to more than one promotions based, in some embodiments, on some distribution function. For example, in the above scenario involving products X and Y, 50% of the credit may go to the first promotion and 50% to the second promotion. In some variations, a scheme to apportion the credit between various promotions may be based, for example, on the time between the display of the promotion and the purchase, or may otherwise be based on some other function that may be dependent on the times of promotion and purchase, and/or on other factors.

In situations where more than one item is being offered to the customer, and it is possible that each of the promoted cross-sale items may have contributed to the success of a promotion, in some embodiments, the first item in the promotion may be credited as being the reason that the promotion succeeded. Thus, if the particular item was the first item in a set of several items being simultaneously cross-sale offered, the running total of successful promotions for that item is incremented by 1.

The transaction (order) was completed successfully (i.e., it was not canceled).

In some implementations, the tally of successful promotions associated with a particular item/product may be increased by a value of less than 1. For example, in situations where the promotion is for a certain item, credit may be given to the combination (promotion) for that item even when the customer bought a different-but-similar item. In such embodiments, the similar items may be grouped to product groups. For example, if we advertise a dessert (a certain cake) and the customer buys a different dessert (e.g., a different cake), it is possible, under these circumstances, that some effectiveness can be attributed to the promotion for the first cake. In some embodiments, credit corresponding to 1/n (or some other function of n) may be assigned. Thus, the bigger the group, the smaller the credit.

Accordingly, in some implementations, fractional success values may be added to the sum of successes for a particular item when:

The promotion was displayed in the course of a particular transaction (order).

After the promotion was displayed, within the same transaction/order, another item in the group of items of the item being promoted was purchased.

The item being promoted was not purchased (since credit is being given for buying a different product than the one being promoted, it can only happen if the same product was not bought.)

In situations where there multiple promotions promoting different items from the same group (e.g., different cakes from the "dessert" group), and the customer ultimately purchases an altogether different item from the same group (e.g., a different cake in the "dessert" group), in some embodiments, only one promotion may receive the credit (e.g., the first promotion). In some embodiments, credit may be apportioned equally between the multiple promotions promoting the various items from the group. Alternatively and/or additionally, based on some time-related distribution, if different items from a particular item group were promoted, and some other item from that same group was purchased, credit for the successful transaction may be apportioned to the various promotions presented that include the items from the group of items that also includes the ultimately purchased item (e.g., give the first promotion with the first item from the item group less credit than what is to be given to a second promotion promoting a second item from that group so as to reflect the fact that the item ultimately purchased was purchased more closely to the time the second promotion was presented.)

The transaction (order) was completed successfully (i.e., the transaction was not canceled).

In some embodiments, fractional credit may also be given in situations where there is a cross-sale of multiple items, and a formulation to apportion the successful promotion to the various items comprising the promotion is thus required. For example, in some embodiments, a factor that can be used to obtain a fractional success value is $1/(n-1)$, n being the number of products in the promoted group of items. The reasoning is that other than the product itself, there are $(n-1)$ other products in the group being promoted that may have contributed to the success of the offer. Thus, for example, if the particular item being promoted is promoted with three (3) other items, and the customer decides to buy all four (4) cross-sale items being promoted, the success value attributed to the particular item whose effectiveness measure is to be computed and updated would be $1/(4-1)=\frac{1}{3}$. In summing the success value for the item, a value of $\frac{1}{3}$ may be added to the tally instead of 1. Other functions to apportion credit may be based on the number of items, n, in the promoted group, or may be based on other variables and/or factors.

Having computed the total number of cross-sale promotions involving a particular item (PI), and the success score for that PI representative of the number of successful promotions (i.e., a promotion ending in a consummated transaction in which a customer purchased the PI and/or another item promoted with the PI), the adjusted effectiveness measure for the PI may be determined. In some implementations, the success score is reduced by a Random Success Factor (RSF). The random success factor indicates the extent to which displaying a promotion for a particular item leads to a random sale success (i.e., a sale which did not result from the promotion itself, but may have resulted from other factors, or may have occurred because the customer was going to purchase the offered item any way).

In some implementations, the random success factor, RSF, may be computed by determining:

$N_p$—The number of transactions/orders in which the particular item, PI, was included in a displayed promotion.

N—The total number of transaction/orders.

P—The number of orders in which the particular item, PI, was being promoted and was in fact ordered.

$P_g$—The number of orders in which one or more other products included in the promotions that also involved the PI, (i.e., products within the product group including the PI) were ordered, but the PI itself was not ordered.

$N_g$—number of products in the promoted product's group.

The random success factor, RSF, can then be computed based on the expression:

$$RSF=[N_p*P+P_g*P/(N_g-1)]/N^2$$

The computed success factor, RSF, is thus used to reduce the success score determined, in some embodiments, based on the above specified rules. For example, in some embodiments, the RSF is subtracted from the success factor, e.g., if it is determined that 5% of the times an item was promoted resulted in a successful sell, but it is also determined that the item has a 2% random success rate (i.e., a successful sell without any relation to the promotion), the true success factor to associate with the particular item should, in this scenario, be 3%. The current effectiveness measure (computed since the last time the effectiveness measure was computed, i.e., without taking into account the old effectiveness measure) may be determined as the reduced successes score (i.e., the score reduced by the RSF) divided by the number of orders in which the promotion was displayed (i.e., $N_p$). Therefore, the current effectiveness measure, denoted $p_{measured}$, provides the current effectiveness measure representative of the likelihood that an offer of cross-sale of the particular item, PI, with respect to which the effectiveness measure is being computed, will be accepted when offered in combination with item(s) that have already been selected by a customer for purchase.

In some implementations, other computations (based on different formulations) may be performed to compute the above listed values, e.g., the current effectiveness measure, $p_{measured}$, the randomness success factor, RSF, etc.

Having computed the current effectiveness measure for the particular item, PI, the old effectiveness measure maintained, for example, in the repository 120, can be adjusted. To compute the adjusted effectiveness measure for the particular item, PI, that adjusts the item's old effectiveness measure based on the effectiveness measure computed for the PI since the last adjustment, the following procedure may be performed.

As noted, in some implementations, each item, or combination of items, is associated with an effectiveness measure, representative of the likelihood, p, that a cross-sale offer of the item(s) will be accepted, and an associated confidence interval. In some embodiments, computations of adjusted effectiveness measure is performed by first increasing the old confidence interval value by some pre-determined confidence value (e.g., 0.005×Period (in days) since the last updating of the confidence interval for the particular item(s)).

Generally, the effectiveness measure and confidence interval associated with a particular item may be computed, in some embodiments, based on the expressions:

$$p = s/N,$$

where p is the likelihood of a successful cross-sale offer, s represents the success score (the number of successful cross-sales) and N is the number of times a cross-sale promotion offering the particular item has been presented to a customer. The values p, s and N may be computed based on certain factors that are taken into account (e.g., s may be computed based on certain rules that define under what circumstances an outcome is to be deemed a success, and s may then be reduced by a success factor, RSF). The confidence interval, CI, may be computed according to the expression:

$$CI = z \cdot \sqrt{\frac{p \cdot (1-p)}{n}}$$

where z represents the number of standard deviations to achieve a required significance (under the assumption of normal distribution). The z factor represents the probability that an actual value will be within the CI. The higher the z factor, the higher that probability is. The required significance, under those circumstances, is computed as (1−z), i.e. the probability its outside the CI. So if z=1, there is a 69% certainty that the value is within CI. A value of z=1 may be used because the purpose of the confidence interval is to be a comparative measure for different estimate values, thus multiplying it by any constant is generally not required. It is to be noted that z=1 corresponds to statistical significance of about 31%, z=2 corresponds to 5%, and z=3 corresponds to 1%.

To compute the updated effectiveness measure and confidence interval for a particular item (or a combination of items), an adjusted value of N is determined using the relationship:

$$N_{old} = p_{old}*(1-p_{old})/\text{confidence}_{old}^2.$$

The updated effectiveness measure may thus be computed according to:

$$p_{updated} = (p_{old}*N_{old} + p_{measured}*N_p)/(N_{old}+N_p),$$

where, as noted above, $p_{measured}$ corresponds to the effectiveness measure computed for the current interval alone (i.e., without factoring in the old effectiveness measure and/or the old confidence interval). Under circumstances where the particular item was not presented in any promotion in the most recent interval, the updated effectiveness measure is simply computed to be $p_{old}$.

The updated value for the confidence interval may be computed according to the expression:

$$CI_{updated} = \sqrt{\frac{p(1-p)}{N_{old}+N_p}}$$

where, as noted, $N_p$ is the number of promotions in which the particular item has been offered in the current period (i.e., since the last time that the effectiveness measure and confidence interval for that particular item have been computed).

It should be noted that the initial values for the effectiveness measures and confidence intervals for any item, or combination of items, presented as a cross-sale offer to a customer in response to a selection by the customer of one or more items may be set, for example, to an effectiveness measure of 0 with a confidence interval of 1. Other initial values may be used.

To illustrate the procedure to update selection parameters (e.g., effectiveness measure, confidence interval, etc.) for a particular item (or a combination of items to be promoted), consider an example in which a particular item A is associated with an effectiveness measure of, for example, 2.5% that was previously computed based on a success score of 5 (e.g., five successful promotions) resulting from 200 cross-sale promotions involving the item A (item A may, in fact, correspond to a combination of several items that are offered as a package deal). The current confidence interval for the item A is computed as $CI_A = \sqrt{(0.025*(1-0.025)/200)} = 0.011$. These parameters are subsequently used in the selection process to determine cross-sale offers to a customer in response to the customer's initial selection of one or more items.

When these parameters are to be updated (e.g., at the end of some pre-determined period), the sum of successful offers resulting from N number of promotions following the most recent update (which resulted in the current effectiveness measure 0.025 and a confidence interval of 0.011) will be used to compute the updated parameters. Suppose that in the above example, over the subsequent pre-determined period (e.g., a week) the item A was cross-sale offered 250 times, and those offers resulted in 10 successful offer acceptances. Thus, during the current period, $N_p$ is 250 and the new effectiveness measure, $p_{measured}$, is 10/250=0.04

Suppose also that the old confidence interval associated with Article A was modified daily to reflect the increasing uncertainty of the validity of the aging parameters, and that by week's end the old confidence interval for item A was modified from its initial 0.011 value to 0.012 (in some embodiments, this modification may occur at set intervals based on some pre-determined function). Accordingly, to update the old parameter values of the effectiveness measure and the confidence interval, an adjusted value N that corresponds to the effectiveness measure of 0.025 and the modified confidence interval of 0.012 is computed according to:

$$N = p(1-p)CI^2,$$

where p is the effectiveness measure representative of the likelihood that a customer would accept a cross-sale offer of A in response to the customer's initial order. Plugging in the values of p=0.025 and CI=0.012, the corresponding adjusted value of N is computed to be approximately 169 samples.

With that computed adjusted value of N corresponding to the periodically modified old confidence interval value, the updated effectiveness measure and updated confidence interval are computed according to the Equations:

$$p_{updated} = (p_{old} * N_{old} + p_{measured} * Np) / (N_{old} + Np)$$

$$\text{and } CI_{updated} = \sqrt{\frac{p(1-p)}{N_{old} + N_p}},$$

to yield the values of $p_{updated}$=0.034, and $CI_{updated}$=sqrt(0.034*(1−0.034)/(169+250))=0.0088.

In the above computation factors, such as the randomness success factor, were not taken into account. However, in some implementation, the RSF, as well as other factors, may be taken into account to compute the selection parameters such as the effectiveness measure and/or the confidence interval.

Turning back to FIG. 1, each of the various systems and devices depicted in FIG. 1, for example, any of the POS 102a-c and/or the computing system 110, may be processor-based systems that includes a computer and/or other types of processor-based devices suitable for multiple applications. Such devices can include volatile and non-volatile memory elements, and peripheral devices to enable input/output functionality.

Figure 4:
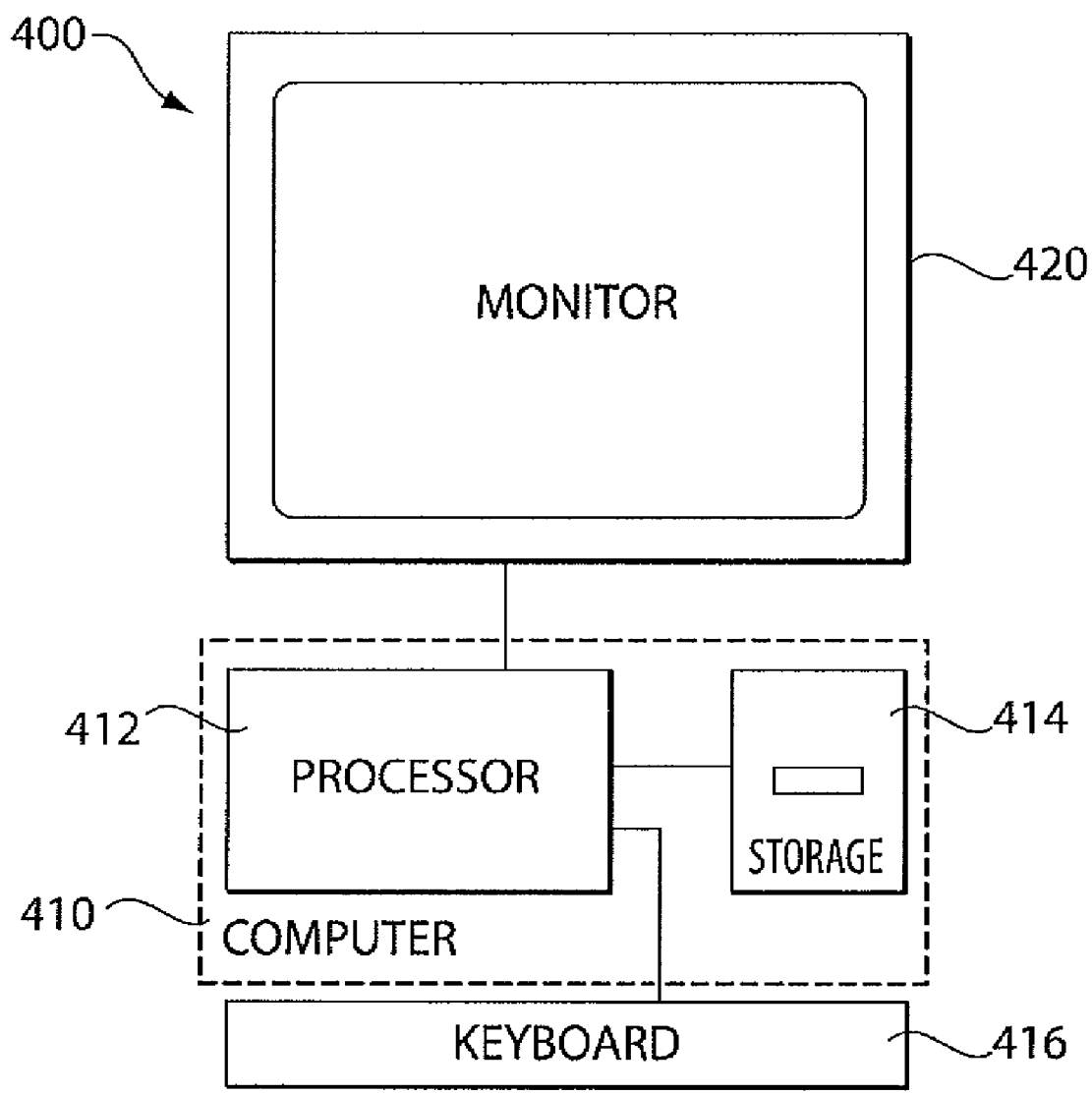
FIG. 4 schematic diagram of a generic computing system.

Specifically, and with reference to FIG. 4 showing a schematic diagram of a generic computing system 400 that may be used to implement any of the processor-based systems depicted in FIG. 1, the computing system 400 includes a processor-based device 410 such as a personal computer, a specialized computing device, and so forth, that typically includes a central processor unit 412. In addition to the CPU 412, the system includes main memory, cache memory and bus interface circuits (not shown). The processor-based device 410 includes a mass storage element 414, such as a hard drive associated with the computer system. In some embodiments, the mass storage element 414, when used in the implementations of computing system 110 shown in FIG. 1, may be used to implement the repository 120 to record and maintain the information relating to the plurality of items and the various combinations of first items and cross-sale of at least another item. The computing system 400 may further include a keyboard, or keypad, 416, and a monitor 420, e.g., a CRT (cathode ray tube) or LCD (liquid crystal display) monitor.

The processor-based device 410 is configured to facilitate, for example, the implementation of the processing of commerce-based activities, e.g., adaptively determining effectiveness measures for combinations of items to be offered in response to customer-selected first items, and subsequently determining items to be offered in a cross-sale to the customer based on, for example, effectiveness measures. The storage device 414 may thus also include a computer program product that when executed on the processor-based device 410 causes the processor-based device to perform operations to facilitate the implementation of the processing of commerce-based activities as described herein. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array) or an ASIC (application-specific integrated circuit) may be used in the implementation of the system 400. Other modules that may be included with the processor-based device 410 are speakers, a sound card, a pointing device, e.g., a mouse or a trackball, by which the user can provide input to the computing system 400. The processor-based device 410 may include an operating system, e.g., Windows XP® Microsoft Corporation operating system. Alternatively, other operating systems could be used.

The various systems and devices constituting the system 100 may be connected using conventional network arrangements. For example, the various systems and devices of system 100 may constitute part of a private packet-based network. Other types of network communication protocols may also be used to communicate between the various systems and systems/devices. Alternatively, the systems and devices may each be connected to network gateways that enable communication via a public network such as the Internet. Network communication links between the systems and devices of system 100 may be implemented using wireless (including, for example, satellite-based implementations) or wire-based links. For example, in some embodiments, the computing system 110 may include broadcasting apparatus (e.g., an antenna, a transceiver such as a network gateway portal connected to a network, etc.) to transmit and receive data signals. Further, dedicated physical communication links, such as communication trunks may be used. Some of the various systems described herein may be housed on a single processor-based device (e.g., a server) configured to simultaneously execute several applications.

Figure 5:
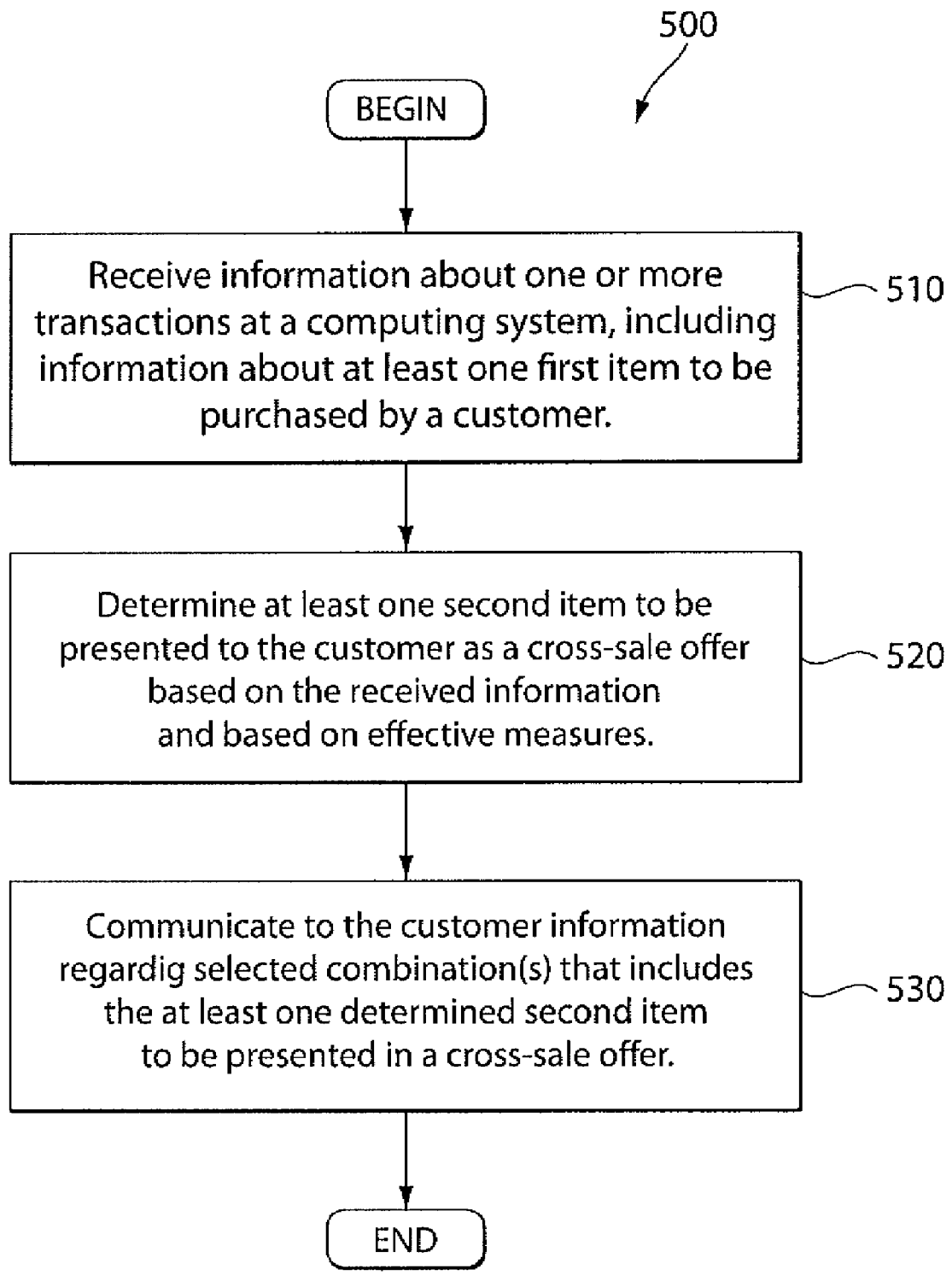
FIG. 5 is a flowchart of a procedure to perform processing of commerce-based activities.

With reference to FIG. 5, a flowchart of a procedure 500 to perform processing for commerce-based activities is shown. Initially, information about one or more transactions is received 510 at a computing system, such as the computing system 110 shown in FIG. 1. Alternatively, the transactions data may be processed locally at each of the individual POS, or one of the POS devices may receive data from all the other interconnected POS devices, and perform the procedures described herein. Each of the one or more transactions corresponds to, for example, an order placed through a POS (such as any of the devices 102a-d shown in FIG. 1) for commerce-based items, e.g., goods and/or services such as fast food items. The transactions data may therefore include data about respective sales of at least one first item selected by a customer from a plurality of items. The plurality of items may correspond to items available through a catalog, a menu, an inventory listing, etc.

Having received the information about the one or more transactions, at least one second item to be presented to the customer as a cross-sale offer is determined 520. The at least one second item is determined based on the received information and based on effective measures and/or other selection parameters (confidence intervals, etc.) that are each associated with at least one combination from a set of combinations that each correspond to the at least one first item to be purchased and a corresponding offer of cross-sale of at least one other item from the plurality of items. That is, as noted herein, combinations associated with the at least one first item initially selected by the customer (the items corresponding to the goods/services the customer wishes to acquire) are identified. Each combination is associated with at least one second item that may be offered to the customer as a cross-sale offer, and is also associated with an effectiveness measured and/or selection parameters. As previously described, each of the effectiveness measures is representative of a likelihood that the at least one other item to be offered to the customer would be accepted when offered in combination with the at least one item that is being purchased by the customer. The combination(s) that is to be selected is selected based on one or more criteria. For example, the combination selected may be the one associated with the largest effectiveness measures of the effectiveness measures associated with the identified combinations that include the at least one first item. Alternatively, in some embodiments, the combination associated with the largest expected profit may be selected. In some embodiments, other criteria to select at least one item to be cross-sale offered may be used (e.g., criteria based on some random element).

Information regarding the selected combination(s) that includes at least one second item is communicated 530 to the customer. Communicating the information to the customer may include transmitting data relating to the selected combination(s), including the identity of the item(s) to be cross-sale offered to the customer, the items' prices, applicable discounts, visual and audible information relating to the item(s), etc. Communicating the information about the selected combination(s) may also include presenting information about the at least one second item in one area of a display device of the POS device through which the initial data of the transactions (regarding the at least one item to be purchased) was ordered. The area where the information about the second item may be presented may be different from the area where information about the at least one item is presented. Thus, in some embodiments, information about the at least second item being cross-sale offered is presented next to the information about the at least one item that the customer is acquiring. Subsequently, the customer makes a decision as to whether he/she will accept, or partly accept, the cross-sale offer of the at least one second item, and the outcome of the cross-sale offer is received through the POS (e.g., by inputting the customer's decision through the keyboard or touch screen of the POS).

Figure 6:
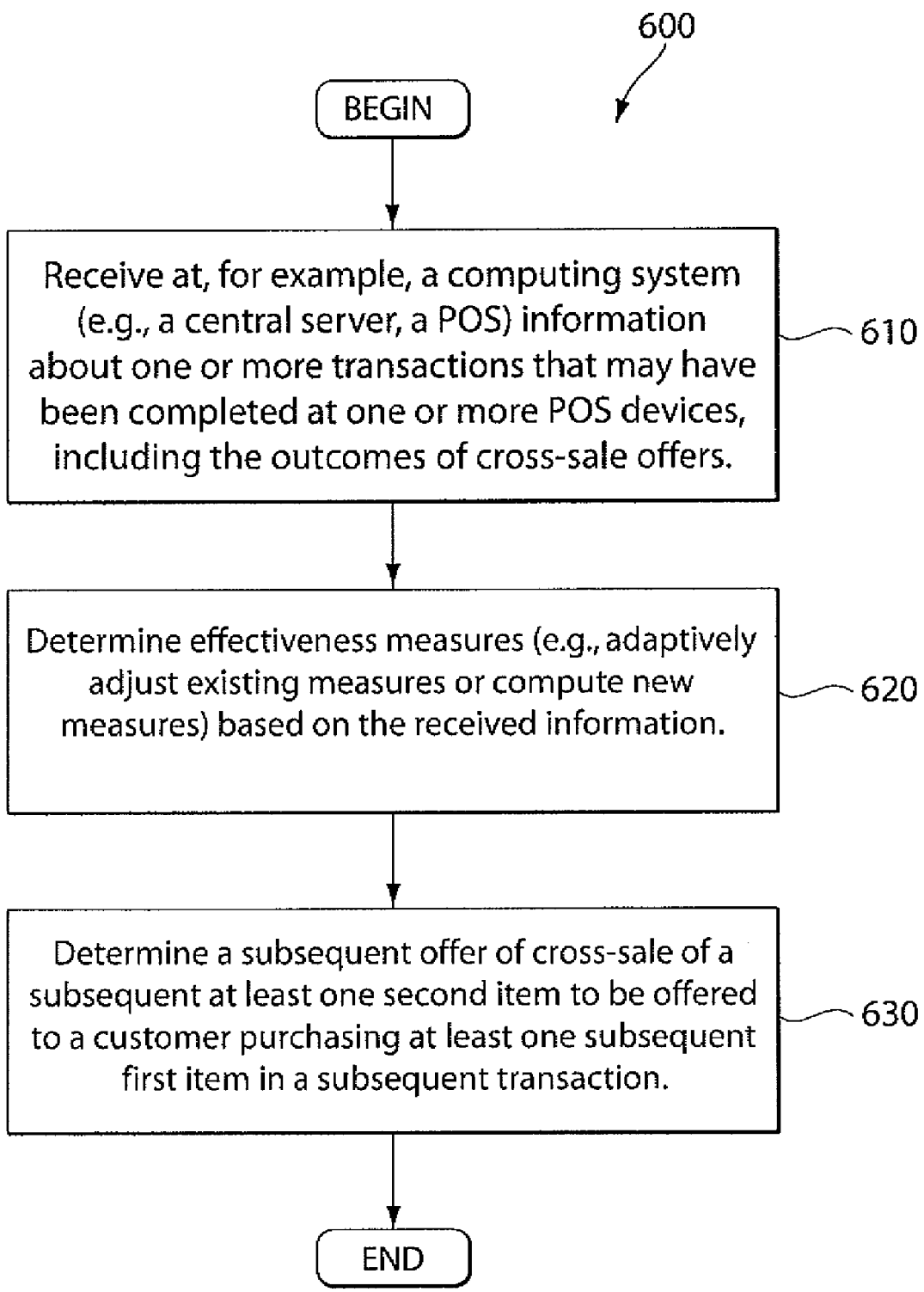
FIG. 6 is a flowchart of a procedure to perform processing of commerce-based activities.

With reference to FIG. 6, a flowchart of an adaptive processing procedure 600 that may be performed using data relating to the cross-sale transactions (which may have been performed using, for example, the procedure 500 depicted in FIG. 5) is shown. Thus, information about one or more transactions that may have been completed at one or more POS devices is received 610 at, for example, a central computing system (e.g., the computing system 110 or one of the POS devices of FIG. 1). The information may be sent at predetermined time instances, and may be an aggregate of all the information with respect to all transactions that occurred during the time interval between the most recent update of selection parameters and the subsequent transmission of information. As noted, each of the one or more transactions includes a respective sale of at least one first item selected by a customer from a plurality of items and an offer of cross-sale of at least one second item offered to the customer from the plurality of items. The received information about the each of the one or more transactions may also include information about the outcomes of the respective offer of cross-sales, the number of times items were cross-sale promoted, etc.

Having received the information about the one or more transactions, the effectiveness measures, such as those used in the processing of the procedure 500, are determined 620 (e.g., adaptively determined) and/or adaptively adjusted (taking into account the old values of the selection parameters, as described herein) based on the received information. In some embodiments, determining the effectiveness measures may include computing probability values to correlate the respective outcomes of the offers of cross-sale of each of at least some of the one or more transactions to at least some of the plurality of items. The computation of such probability values (be it new probability values or adjusted probability values) may be performed not only with respect to the particular combination of items involved in a just completed transaction (i.e., the initial items selected by the customer and the items being cross-sale offered), but may also be performed with respect to individual items included in the one or more transactions, and even for other items that were not necessarily involved in the transaction. For example, if the information received includes an indication of a successful (i.e., accepted) cross-sale offer for an apple pie, the effectiveness measures in relation to the items initially ordered by the customer will be adjusted. Additionally, the effectiveness measures for similar combinations that include other types of desserts (although not necessarily the particular dessert of the current transaction) may be also updated as some correlation between the effectiveness measures of other combinations and the outcome of the completed transaction exists.

Subsequent transactions involving subsequent offers of cross-sale offer may therefore be based on the adaptively determined effectiveness measures for the various items that may be offered in cross-sale offer. Thus, a subsequent offer of cross-sale of a subsequent at least one second item to be offered to a customer purchasing at least one first item in a subsequent transaction is determined 630. The information that would later be received in relation to the subsequent transaction (including information about the outcome of any cross-sale offer associated with the subsequent transaction(s)) may subsequently be used once again to determine effectiveness measures (e.g., generate new effectiveness measures or adaptively adjust the values of existing effectiveness measures).

Various embodiments of the subject matter described herein may be realized in digital electronic circuitry, integrated circuitry, specially designed ASICs (application specific integrated circuits), computer hardware, firmware, software, and/or combinations thereof. These various embodiments may include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device. Some embodiments include specific "modules" which may be implemented as digital electronic circuitry, integrated circuitry, specially designed ASICs (application specific integrated circuits), computer hardware, firmware, software, and/or combinations thereof.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented in the present application, are herein incorporated by reference in their entirety.

Although a few variations have been described in detail above, other modifications are possible. For example, the logic flows depicted in the accompanying figures and described herein do not require the particular order shown, or sequential order, to achieve desirable results.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by execution of computer readable program code on one or more processor-based computing devices, the method comprising:
   receiving, at the one or more processor-based computing devices, information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item; and
   determining, at the one or more processor-based computing devices, effectiveness measures based on the received information, each of the effectiveness measures being associated with at least one of a plurality of combinations of at least one item from the plurality of purchasable items and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items and computed based on $p=s/N$, where p represents the likelihood of the cross sale of the respective at least other item when offered in combination with the respective at least one item from the plurality of purchasable items, s represents a number of successful cross sales over a period of time for the respective at least other item when offered in combination with the respective at least item from the plurality of purchasable items, and N is the number of times a cross-sale promotion offering the respective at least other item in combination with the respective at least one item from the plurality of purchasable items has been presented to the customer over the period of time.

2. The method of claim 1, wherein determining the effectiveness measures based on the received information comprises:
   computing probability values to correlate the respective outcome of the offer of cross-sale of each of at least some of the one or more transactions to at least some of the plurality of purchasable items.

3. The method of claim 1, further comprising:
   determining, based on the determined effectiveness measures, a subsequent offer of cross-sale of a subsequent at least one second item to be offered to a subsequent customer purchasing a subsequent at least one first item in a subsequent transaction.

4. The method of claim 3, wherein determining, based on the determined effectiveness measures, the subsequent offer of the cross-sale of the subsequent at least one second item comprises:
   identifying from the plurality of combinations a combination associated with the largest effective measure of combinations from the plurality of combinations including a respective at least one item to be purchased matching the subsequent at least one item being purchased.

5. The method of claim 3, further comprising: presenting to the subsequent customer the subsequent offer of the cross-sale of the subsequent at least one second item.

6. The method of claim 3, further comprising:
   presenting the subsequent at least one first item in a first area of a display device; and
   presenting the subsequent at least one second item in a second area of the display device.

7. The method of claim 1, further comprising:
   computing confidence interval values associated with at least some of the effectiveness measures, the confidence interval values being representative of uncertainty associated with respective the at least some of the effectiveness measures representative of the likelihood of the corresponding offers of the cross-sale of the at least other item being accepted when offered in combination with the respective at least one item from the plurality of purchasable items.

8. The method of claim 7, further comprising:
determining, based on values computed based on the at least some of the effectiveness measures and selected random values within the respective associated confidence intervals, a subsequent offer of cross-sale of a subsequent at least one second item to be offered to a subsequent customer purchasing a subsequent at least one first item in a subsequent transaction.

9. The method of claim 1, wherein the information about each of the one or more transactions further comprises one or more of: description of the at least one first item, price of the at least one first item, sum of the price of all the at least one first item, time of the each of the one or more transactions, a description of the corresponding at least one second item offered in the cross-sale of the each of the one or more transactions and a price of the corresponding at least one second item offered in the cross-sale of the each of the one or more transactions.

10. The method of claim 1, wherein the plurality of purchasable items includes at least one food product.

11. A computer program product residing on a non-transitory computer readable storage device comprising computer instructions that when executed on one or more processor-based devices cause the one or more processor-based devices to:
receive information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item; and
determine effectiveness measures based on the received information, each of the effectiveness measures being associated with a corresponding at least one of a plurality of combinations of at least one item from the plurality of purchasable items and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items and computed based on $p=s/N$, where p represents the likelihood of the cross sale of the respective at least other item when offered in combination with the respective at least one item from the plurality of purchasable items, s represents a number of successful cross sales over a period of time for the respective at least other item when offered in combination with the respective at least item from the plurality of purchasable items, and N is the number of times a cross-sale promotion offering the respective at least other item in combination with the respective at least one item from the plurality of purchasable items has been presented to the customer over the period of time.

12. The computer program product of claim 11, further comprising instructions to cause the one or more processor-based devices to:
determine, based on the determined effectiveness measures, a subsequent offer of cross-sale of a subsequent at least one second item to be offered to a subsequent customer purchasing a subsequent at least one first item in a subsequent transaction.

13. A system comprising:
at least one processor-based device; and
a storage device coupled to the at least one processor-based device, the storage device storing computer instructions that when executed on the at least one processor-based device cause the at least one processor-based device to:
receive information about one or more transactions, each of the one or more transactions including a respective sale of at least one first item selected by a customer from a plurality of purchasable items and an offer of cross-sale of at least one second item offered to the customer from the plurality of purchasable items, the information about the each of the one or more transactions including information about an outcome of the respective offer of cross-sales of the at least one second item; and
determine effectiveness measures based on the received information, each of the effectiveness measures being associated with a corresponding at least one of a plurality of combinations of at least one item from the plurality of purchasable items to be purchased and a corresponding offer of cross-sale of at least another item from the plurality of purchasable items, each of the effectiveness measures being representative of a likelihood of the corresponding offer of the cross-sale of the at least other item being accepted when offered in combination with the respective at least one item from the plurality of purchasable items and computed based on $p=s/N$, where p represents the likelihood of the cross sale of the respective at least other item when offered in combination with the respective at least one item from the plurality of purchasable items, s represents a number of successful cross sales over a period of time for the respective at least other item when offered in combination with the respective at least item from the plurality of purchasable items, and N is the number of times a cross-sale promotion offering the respective at least other item in combination with the respective at least one item from the plurality of purchasable items has been presented to the customer over the period of time.

14. The system of claim 13, wherein the computer instructions further include instructions to cause the at least one processor-based device to:
determine, based on the determined effectiveness measures, a subsequent offer of cross-sale of a subsequent at least one second item to be offered to a subsequent customer purchasing a subsequent at least one first item in a subsequent transaction.

15. The system of claim 13, further comprising:
a point-of-sale (POS) device including:
a display device,
a user input device to receive user input including user selection of the at least one first item and information about the outcome of the offer of cross-sale of the at least one second item, and
a communication transceiver to transmit to the at least one processor-based device at least the user selection of the at least one first item and the information about the outcome of the offer of cross-sale.

16. A method for performing adaptive commerce-based activities, performed by execution of computer readable program code on one or more processor-based computing devices, the method comprising:
receiving, at the one or more processor-based computing devices, information about at least one transaction, the at least one transaction including information about at least one first item selected by a customer from a plurality of purchasable items;

determining, at the one or more processor-based computing devices, at least one second item to be presented to the customer based on the received information and based on effective measures that are each associated with at least one combination from a set of combinations that each includes the at least one first item to be purchased and a corresponding offer of cross-sale of at least one other item from the plurality of purchasable items, each of the effectiveness measures being representative of a likelihood that the at least one other item to be offered to the customer would be accepted when offered in combination with the at least one first item being purchased and computed based on p=s/N, where p represents the likelihood of the cross sale of the respective at least one other item when offered in combination with the respective at least one item from the plurality of purchasable items, s represents a number of successful cross sales over a period of time for the respective at least one other item when offered in combination with the respective at least item from the plurality of purchasable items, and N is the number of times a cross-sale promotion offering the respective at least one other item in combination with the respective at least one item from the plurality of purchasable items has been presented to the customer over the period of time; and communicating information to the customer about a cross-sale offer to purchase the determined at least one second item.

17. The method of claim 16, further comprising: presenting the at least one first item in a first area of a display device; and presenting the determined at least one second item in a second area of the display device.

18. The method of claim 16, further comprising: receiving a further communication responsive to the information communicated to the customer about the cross-sale offer, the further communication including information about an outcome of the cross-sale offer.

19. The method of claim 18, further comprising: adjusting the effectiveness measures based, at least in part, on one or more of the information about the at least one transaction, the information about the cross-sale offer, and the information about the outcome of the cross-sale offer.

20. A point-of-sale device comprising:
a display device;
a user input device to receive input including customer selection of at least one first item and information about an outcome of an offer of cross-sale of at least one second item presented to the customer on the display device; and
a communication module to communicate to at least one processor-based device at least one of the selection of the at least one first item and the information about the outcome of the offer of cross-sale;
wherein the at least one second item presented to the customer is determined, at the at least one processor-based device, based, at least in part, on the selection of the at least one first item and based on effective measures that are each associated with at least one combination from a set of combinations that each includes the at least one first item to be purchased and a corresponding offer of cross-sale of at least one other item from a plurality of purchasable items, each of the effectiveness measures being representative of a likelihood that the at least one other item from the plurality of purchasable items to be offered to the customer would be accepted when offered in combination with the at least one item and computed based on p=s/N, where p represents the likelihood of the cross sale of the respective at least one other item when offered in combination with the respective at least one item from the plurality of purchasable items, s represents a number of successful cross sales over a period of time for the respective at least one other item when offered in combination with the respective at least item from the plurality of purchasable items, and N is the number of times a cross-sale promotion offering the respective at least one other item in combination with the respective at least one item from the plurality of purchasable items has been presented to the customer over the period of time.

21. The method of claim 7, wherein each of the confidence interval values is computed according to $$CI = z \cdot \sqrt{\frac{p(1-p)}{N}},$$

where z represents number of standard deviations to achieve a statistical significance, p represents the likelihood of the cross sale of the respective at least other item when offered in combination with the respective at least one item from the plurality of purchasable items, and N is the number of times a cross-sale promotion offering the respective at least other item in combination with the respective at least one item from the plurality of purchasable items has been presented to the customer over the period of time.

* * * * *